United States Patent [19]

Chaussade et al.

[11] Patent Number: 5,763,089
[45] Date of Patent: Jun. 9, 1998

[54] ASYMMETRIC GLASS-PLASTICS SAFETY GLASS PANE

[75] Inventors: Pierre Chaussade; Catherine Heutte, both of Sully Sur Loire, France

[73] Assignee: Saint-Gobain Vitrage, Courbevoie, France

[21] Appl. No.: 540,217

[22] Filed: Oct. 6, 1995

[30] Foreign Application Priority Data

Oct. 6, 1994 [FR] France .................................. 94 11958

[51] Int. Cl.⁶ ...................... B32B 27/00; B32B 17/10; B32B 9/04
[52] U.S. Cl. .................. 428/425.3; 156/106; 428/425.6; 428/437; 428/447
[58] Field of Search .................... 428/911, 430, 428/437, 448, 425.3, 425.6, 447; 156/104, 106

[56] References Cited

U.S. PATENT DOCUMENTS 4,062,887 12/1977 Chang et al. .
4,242,403 12/1980 Mattimoe et al. ................... 428/213
4,948,672 8/1990 Cartier .................................. 428/424.4

FOREIGN PATENT DOCUMENTS 2 322 106   3/1977   France .
0 527 682 A1   2/1993   France .

Primary Examiner—D. S. Nakarani
Assistant Examiner—Holly C. Rickman
Attorney, Agent, or Firm—Oblon, Spivak, McClelland,Maier & Neustadt, P.C.

[57] ABSTRACT

A glass-plastics bilayer safety glass pane, comprising a substrate of glass, and a complex sheet of plastics material comprising a layer of PVB and a film of polyester provided with a scratch-resistant and abrasion-resistant coating, and a layer of thermoplastic polyurethane incorporated between the glass substrate and the PVB layer.

22 Claims, No Drawings

ASYMMETRIC GLASS-PLASTICS SAFETY GLASS PANE

BACKGROUND OF THE INVENTION

1. Field of the Invention

This invention relates to a composite safety glass pane, having resistance to penetration (or energy absorption) and anti-laceration (or anti-splinter) properties which are retained in widely varying conditions of temperature and humidity. This pane is suitable for use as a safety glass for transportation vehicles.

2. Discussion of the Background

Conventional glass is a hard, brittle material which breaks into dagger-like shards. Personal injury can result from both direct impact with the glass and lacerations from flying shards.

Safety glass contains an energy-absorbing plastic layer(s) bonded to a glass sheet. On breakage of the glass, shards adhere to the plastic layer, minimizing laceration injuries. The energy-absorbing property of the plastic layer minimizes injury due to direct impact.

Safety glass panes having both penetration resistance properties and anti-laceration properties are described in Patent Publications FR-A-2 398 606 and FR-A-2 549 036. These panes are formed of a monolithic or laminated substrate of glass and of a sheet of plastics material intended to be towards the internal compartment of the transportation vehicle. The plastics material sheet comprises an adhesive layer of polyurethane, additionally capable of assuring energy-absorber properties depending upon the thickness used, and a film (termed "surface film") possessing properties of resistance to scratching and abrasion.

Other panes having this asymmetric structure, known as "two-layer" or "bilayer" structure, i.e., a glass substrate and a sheet of plastics material, are described in U.S. Pat. Nos. 3,900,673 and 4,469,743. In this variant, the sheet of plastics material which contains a reinforcing sheet of polyethylene terephthalate (PET) adheres to the glass substrate via an intermediate layer of plasticized polyvinyl butyral (PVB).

This variant is satisfactory in terms of adhesion and energy-absorption properties when the pane is subjected to standard temperatures and humidity conditions. In particular, the penetration resistance of the PVB layer in these conditions is better than that of a layer of the same thickness of polyurethane. In contrast, at low temperature these properties are no longer satisfactory, i.e., the PVB layer loses a large part of its mechanical properties, in particular its penetration resistance properties. Furthermore, in the presence of high humidity the adhesion of the PVB to the substrate of glass is generally no longer sufficient.

SUMMARY OF THE INVENTION

Accordingly, one object of this invention is to provide a novel asymmetric safety glass offering both energy absorption and anti-laceration (or anti-splinter) properties retained in widely varying conditions of temperature and humidity, comprising a glass substrate, a complex sheet containing a layer of PVB and a film of polyester, preferably PET, the polyester sheet having a scratch-resistant and abrasion-resistant outer coating, and a supplementary adhesive film of thermoplastic polyurethane incorporated between the glass sheet and the layer of PVB.

By "complex sheet" is meant a multi-layer sheet containing a layer of PVB and a film (layer) of polyester, preferably PET, the polyester layer having a scratch-resistant and abrasion-resistant outer coating (layer).

By "thermoplastic polyurethane" is meant a polyurethane that is essentially thermoplastic or has a thermoplastic character.

The addition of an adhesive film of polyurethane enables good bonding of the complex sheet with the glass substrate via the intermediate PVB layer, in very widely varying conditions of temperature and humidity.

Preferably, the adhesive film of polyurethane has sufficient thickness to also possess energy-absorbing properties, i.e., greater than 0.2 mm.

The combination thus realized in a pane of the bilayer type of an adhesive and energy-absorber film of polyurethane with an energy-absorber film of PVB, enables the good anti-penetration properties and/or anti-splinter properties of the pane to be retained over a very wide range of temperatures and particularly at low temperatures, that is at temperatures lower than 0° C. and, surprisingly, even below −20° C.

To assure the integrity of the bond of the polyurethane film to the glass substrate, a primer is preferably used, which is deposited on the contact face of the glass and/or the contact face of the polyurethane film, preferably on the contact face of the glass. A suitable primer may contain a coupling agent of the organosilane type, preferably on the contact face of the glass. In a variant, the polyurethane film may contain within its mass such a coupling agent, which renders the use of the primer for the glass surface optional.

A suitable organosilane is preferably gamma-aminopropyltriethoxysilane, gamma-aminopropyltrimethoxysilane, gamma-mercaptopropyltrimethoxysilane, gamma-glycidoxypropyltrimethoxysilane, gamma-chloropropyltrimethoxysilane, vinyltrichlorosilane.

The glass substrate may be a laminated or a monolithic substrate. The glass sheet or sheets may be of annealed glass or of thermally toughened or chemically toughened glass of varying thickness.

The polyurethane film is preferably present in the form of a film of aliphatic, or cycloaliphatic, or aliphatic-aromatic thermoplastic polyurethane, the thickness of which may range from 0.1 to 3 mm, preferably from 0.2 to 2 mm, more preferably from 0.2 to 1 mm.

The polyurethane film is generally formed from an isocyanate component chosen from among the aliphatic, cycloaliphatic, and aliphatic-aromatic isocyanates that are not sensitive to light, and capable of containing urea functions, or again isocyanate biurets, and from a polyol component comprising at least one long polyol chosen from among the polyether polyols or the polyester polyols having a molecular mass between 450 and 2,000, the polycaprolactones of molecular mass between 500 and 2,000, the polycarbonate polyols and polyester polycarbonate polyols of molecular mass between 1,000 and 2,000, the polybutadienes having hydroxyl or carboxyl function, associated where applicable with at least one short diol of molecular mass between 50 and 200.

Examples of isocyanates are the difunctional aliphatic isocyanates such as 1,6-hexane diisocyanates, 2,2,4-trimethyl-1,6-hexane diisocyanate, 2,4,4-trimethyl-1,6-hexane diisocyanate, 1,3-bis (isocyanatomethyl) benzene, bis-(4-isocyanatocyclohexyl) methane, bis-(3-methyl-4-isocyanatocyclohexyl)methane, 2,2-bis-(4-isocyanatocyclohexyl) propane and 3-isocyanatomethyl-3,5,5-trimethylcyclohexylisocyanate, p-phenylene diisocyanate and p-cyclohexyl diisocyanate.

Examples of polyols are those obtained by reaction of polyfunctional alcohols with aliphatic diacids or cyclic ethers, such as 1.2-ethane diol (ethylene glycol), 1,2-propane diol, 1,3-propane diol, 1,2-butane diol, 1,4-butane diol, 2,2-dimethyl-1,3-propane diol (neopentyl glycol), 1,6-hexane diol, 2-methyl-2,4-pentane diol, 3-methyl-2,4-pentane diol, 2-ethyl-1,3-hexane diol, 2,2,4-trimethyl-1,3-pentane diol, diethylene glycol, triethylene glycol, the polyethylene glycols, dipropylene glycol, tripropylene glycol, the polypropylene glycols or 2,2-bis (hydroxymethyl) 1,1-propanol (trimethylolethane), 2,2-bis (hydroxymethyl)-1-butanol (trimethylol propane), 1,2,4-butane triol, 1,2,6-hexane triol, 2,2-bis (hydroxymethyl)-1, 3-propane diol (pentaerythritol), 1,2,3,4,5,6-hexane hexol (sorbitol), cyclohexane dimethanol.

Examples of aliphatic diacids are malonic acid, succinic acid, glutaric acid, adipic acid, suberic acid and sebacic acid.

The polyol component may in addition contain, where applicable, a cross-linking agent having a functionality greater than 2, such as a triol of molecular mass between 100 and 3,000.

The term "thermoplastic character" means a polyurethane film which behaves as a thermoplastic film, notably during assembly with the glass substrate. The polyurethane film may nevertheless have cross-linking bonds, due preferably to the use of a polyol or a polyisocyanate of functionality greater than 2 in a small quantity, preferably less than 10% by weight.

The complex sheet is formed of a film of plasticized PVB associated with a film of polyester, such as PET, coated with a hard anti-scratch and anti-abrasion protective film based on polysiloxane or with a self-healing film, preferably based on a cross-linked (thermosetting) polyurethane.

An example of suitable plasticized PVB is that sold commercially under the trade name SAFLEX® by the MONSANTO company, or under the trade name BUTAC-ITE® by the DU PONT DE NEMOURS company in various thicknesses including 0.38, 0.76, 0.95, 1.14, and 1.52 mm. The thickness is preferably 0.38 mm or 0.76 mm.

The polyester film preferably has a thickness less than 0.5 mm.

The hard coating of organopolysiloxane preferably has a thickness between 0.5 and 50 µm.

The complex sheet formed of a layer of PVB and a film of polyester, notably PET, coated with an anti-scratch and anti-abrasion film, may be produced at the time itself of the assembly operation of the pane, by stacking of the elements.

Preferably, the invention uses a prefabricated complex sheet comprising a layer of PVB of 0.38 or 0.76 mm thickness and a film of PET of approximately 0.2 mm thickness, coated with a polysiloxane film. An example of a complex sheet of this type is that sold commercially under the trade name of SPALLSHIELD® by the DU PONT DE NEMOURS company.

The invention therefore envisages the association of a layer of a polyurethane that is thermoplastic or has a thermoplastic character with a film of plasticized PVB for the purpose of providing a (bilayer) safety pane having resistance to penetration and anti-splinter properties which are retained over a wider range of temperatures and in more extreme humidity conditions than those made possible by the use of PVB alone.

Other features of the invention will become apparent in the course of the following descriptions of exemplary embodiments which are given for illustration of the invention and are not intended to be limiting thereof.

EXAMPLES

Example 1

A pane according to this invention is produced by assembling a sheet of annealed glass of 3 mm thickness with a complex sheet. The glass sheet is first treated with a composition of a product based upon organosilane, i.e., gamma-aminopropyltriethoxysilane (sold commercially under the trade name A1100 by UNION CARBIDE). The complex sheet is formed of a layer of plasticized PVB of 0.38 mm thickness and a film of PET of 0.18 mm thickness coated with a polysiloxane film. The assembly is then carried out by interposing a film of thermoplastic polyurethane of 0.3 mm thickness between the glass sheet and the complex sheet.

The whole assembly is placed in a bag after having placed, on the PET film, another glass sheet equipped with a demolding agent, used as a counter-mold.

The bag is subjected to vacuum in order to create a preassembly. Then the assembly is placed in an autoclave for the purpose of producing the definitive assembly by the combined action of temperature (approximately 130° C.) and pressure (approximately 10 bars) for approximately 1 hour.

On leaving the autoclave, the glass sheet forming the counter-mold is removed and the pane is ready to be mounted in a bodywork opening as a safety windshield.

Comparative Example 1

A pane is produced in the same manner as in Example 1, but by direct assembling of a complex sheet composed of a layer of plasticized PVB of 0.76 mm thickness and a PET film of 0.18 mm thickness, coated with a polysiloxane coating, with an annealed glass sheet of 3 mm thickness, the bonding to the glass taking place directly via the PVB layer of the complex sheet, in the absence of polyurethane.

Example 2

A pane is produced by assembling a sheet of chemically toughened glass of 3 mm thickness and a complex sheet composed of a film of plasticized PVB of 0.76 mm thickness, a film of PET of 0.18 mm thickness coated with a polysiloxane protective coating, by interposing between the glass sheet, previously treated with a primer composition based upon gamma-aminopropyltriethoxysilane, and the complex sheet, a sheet of thermoplastic polyurethane of 2 mm thickness. The procedure is as in Example 1.

To demonstrate the advantages of the invention, the adhesion values are measured by the method of the peeling test, which consists of applying to a 1 cm wide strip a pull perpendicular to the surface of the pane with a pulling speed of 5 cm per minute, at different temperatures.

At 20° C., the values are respectively for Example 1, Comparative Example 1 and Example 2: 20 daN, 7 daN, 20 daN.

At 0° C. the values are 21 daN, 7 daN, 19 daN.

In addition, the panes of Examples 1 and 2 have anti-splinter properties down to temperatures of −20° C. and even below, whereas the pane according to Reference Example 1 loses its anti-splinter properties at a temperature of approximately 5° C.

In a humid atmosphere (100% relative humidity, 55° C.), the panes according to Examples 1 and 2 exhibit adhesion values of 8 daN/cm under the peeling test. For the pane according to the Reference Example the adhesion value is almost zero, and unsticking of the complex sheet is observed.

This application is based upon French Application No. 94-11958 filed in the National Institute of Industrial Property (INPI) on Oct. 6, 1994, the entire contents of which are hereby incorporated by reference.

What is claimed as new and desired to be secured by Letters Patent of the United States is:

1. A safety glass pane comprising:
   (a) a glass substrate;
   (b) a multi-layer sheet of plastic material comprising:
      (i) a polyester layer having a first surface and a second surface,
      (ii) a scratch-resistant and abrasion-resistant coating bonded to the first surface of the polyester layer, and
      (iii) a layer of plasticized PVB bonded to the second surface of the polyester layer;
   and
   (c) a thermoplastic polyurethane layer incorporated between the glass substrate and the PVB layer of the multilayer sheet, the polyurethane layer bonding the glass substrate to the PVB layer,
   wherein a primer comprising an organosilane has been deposited on a surface of the glass substrate or a surface of the thermoplastic polyurethane layer, between the glass substrate and the thermoplastic polyurethane layer.

2. The pane according to claim 1, wherein the polyester layer comprises PET.

3. The pane according to claim 1, wherein the glass substrate comprises a sheet of annealed or toughened glass.

4. The pane according to claim 3, wherein the glass substrate is chemically toughened.

5. The pane according to claim 1, wherein the polyurethane layer has a thickness of from 0.05 to 3 mm.

6. The pane according to claim 1, wherein the glass substrate comprises a laminated structure of glass.

7. The pane according to claim 1, wherein the scratch-resistant and abrasion-resistant coating comprises an organopolysiloxane.

8. The pane according to claim 1, wherein the primer composition is selected from the group consisting of gamma-aminopropyltriethoxysilane, gamma-aminopropyltrimethoxysilane, gamma-mercaptopropyltrimethoxysilane, gamma-glycidoxypropyltrimethoxysilane, gamma-chloropropyltrimethoxysilane, and vinyltrichlorosilane.

9. The pane according to claim 1, wherein said pane comprises only one glass substrate.

10. A safety glass pane, comprising:
    (a) a glass substrate;
    (b) a multi-layer sheet of plastic material comprising:
       (i) a polyester layer having a first surface and a second surface,
       (ii) a scratch-resistant and abrasion-resistant coating bonded to the first surface of the polyester layer, and
       (iii) a layer of plasticized PVB bonded to the second surface of the polyester layer;
    and
    (c) a thermoplastic polyurethane layer incorporated between the glass substrate and the PVB layer of the multi-layer sheet, the polyurethane layer bonding the glass substrate to the PVB layer,
    wherein the thermoplastic polyurethane layer comprises an organosilane.

11. The pane according to claim 10, wherein the polyester layer comprises PET.

12. The pane according to claim 10, wherein the glass substrate comprises a sheet of annealed or toughened glass.

13. The pane according to claim 10, wherein the polyurethane layer has a thickness of from 0.05 to 3 mm.

14. The pane according to claim 10, wherein the glass substrate comprises a laminated structure of glass.

15. The pane according to claim 10, wherein the scratch-resistant and abrasion-resistant coating comprises an organopolysiloxane.

16. The pane according to claim 10, wherein said polyurethane layer has a thickness of at least 0.2 mm.

17. The pane according to claim 10, wherein said polyurethane has a thickness of from 0.1 to 3 mm.

18. The pane according to claim 10, wherein said polyurethane has a thickness of from 0.2 to 2 mm.

19. The pane according to claim 10, wherein said polyurethane has a thickness of from 0.2 to 1 mm.

20. The pane according to claim 10, wherein said polyurethane is cross-linked.

21. The pane according to claim 10, wherein said pane comprises only one glass substrate.

22. A method comprising:
    interposing a thermoplastic polyurethane layer between a glass substrate and a multi-layer sheet;
    wherein said multi-layer sheet comprises:
       (i) a polyester layer having a first surface and a second surface,
       (ii) a scratch-resistant and abrasion-resistant coating bonded to the first surface of the polyester layer, and
       (iii) a layer of plasticized PVB bonded to the second surface of the polyester layer;
    and
    a surface of said glass sheet or a surface of said thermoplastic polyurethane having been treated with a primer composition comprising an organosilane.

\* \* \* \* \*